Nov. 11, 1969    W. R. DOLDING    3,477,390
ACCUMULATING CONVEYOR SYSTEM
Filed May 29, 1967    2 Sheets-Sheet 1
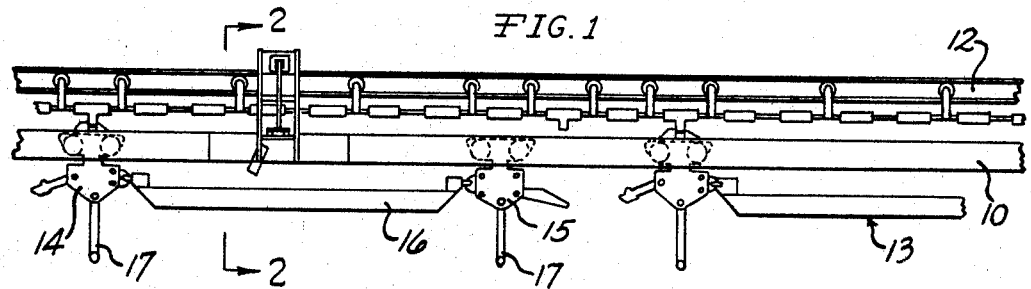
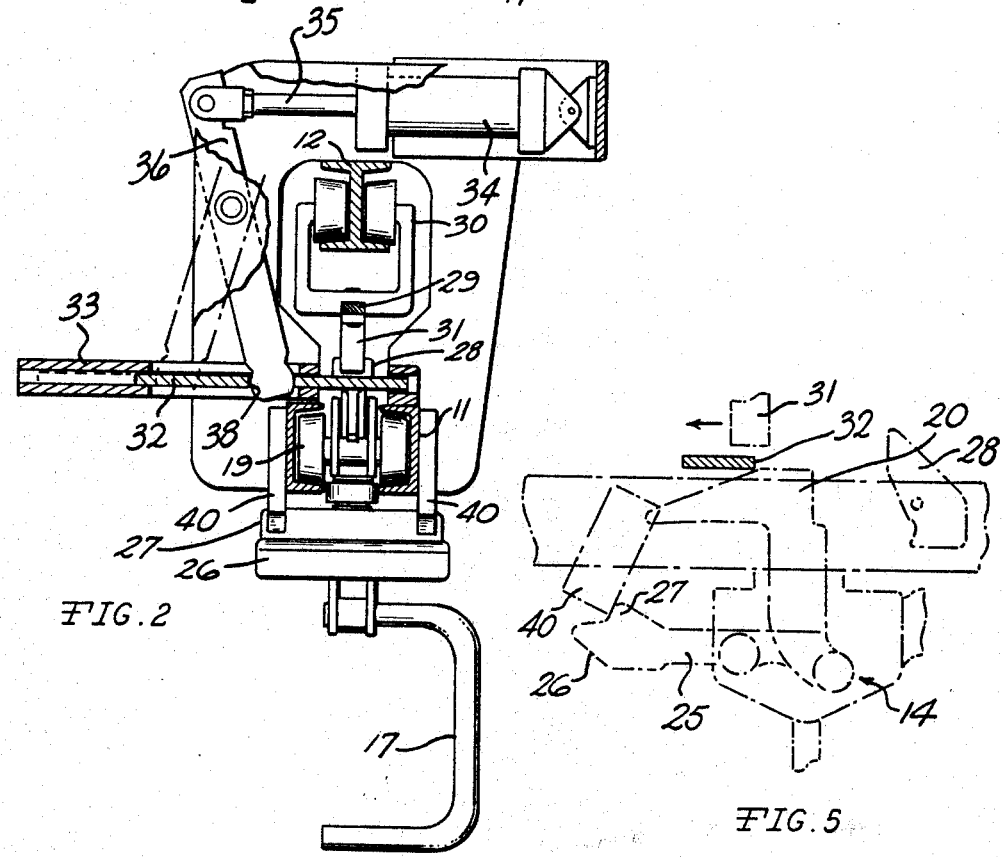
INVENTOR
WALTER R. DOLDING
BY
Barnes, Kisselle, Raisch & Choate
ATTORNEYS

INVENTOR.
WALTER R. DOLDING
BY
ATTORNEYS 3,477,390
ACCUMULATING CONVEYOR SYSTEM
Walter R. Dolding, St. Clair Shores, Mich., assignor, by mesne assignments, to American Chain & Cable Company, Inc., New York, N.Y., a corporation of New York
Filed May 29, 1967, Ser. No. 642,105
Int. Cl. B61b *13/06;* B61c *11/02;* B61k *7/16*
U.S. Cl. 104—172					8 Claims

ABSTRACT OF THE DISCLOSURE

The power and free conveyor system disclosed herein comprises a main track along which a plurality of carriers are movable and a conveyor chain track along which a chain is movable, the conveyor track and the chain track in the zone in question being uniformly spaced relative to one another. Each carrier is provided with a movable pusher dog that is engaged by pusher lugs on the conveyor chain to move the carrier along the track. In order to interrupt the movement of the carrier to perform an operation on the work supported by the carrier or to accommodate timing of the operations in the conveyor system, a stop member is movable into the path of the pusher dogs to move the pusher dogs out of the path of the pusher lugs of the conveyor chain. The pusher dog is interconnected with an accumulating lever that is movable when the pusher dog is depressed to a position where it engages a fixed stop on the conveyor track to prevent inadvertent forward movement of the carrier along the track.

This invention relates to power and free conveyor systems and particularly to accumulating power and free conveyor systems.

BACKGROUND OF THE INVENTION

In power and free conveyor systems, it is common to provide a main track along which a plurality of carriers are movable and a conveyor or chain track along which a chain is moved. The carriers commonly have a depressible pusher dog which is engaged by a pusher lug on the conveyor chain to move the carriers along the track. Where it is desired to stop the movement of the carriers, for example, to perform an operation on the articles supported by the carriers or to accommodate the operations in a production line, it has heretofore been common to increase the spacing between the main track and the conveyor chain track and to provide a stop member that is movable into position at the point of increased spacing to depress the pusher dog and hold out of the path of the pusher lug of the conveyor chain. Such an arrangement is shown, for example, in the copending application of Leonard J. Bishop, Ser. No. 588,175, filed Oct. 20, 1966, now Patent No. 3,437,054, and having a common assignee with the present application. Although such a system is quite successful, occasionally because of the nature of the load being supported by the carrier, it is possible that inadvertently the carrier will move past the stop member.

Among the objects of the present invention are to provide a power and free conveyor system which obviates the aforementioned difficulties in the prior art, which utilizes a uniform spacing between the main track and the conveyor chain track, which positively stops the movement of the carrier, and which is simple and low in cost.

SUMMARY

The power and free conveyor system disclosed herein comprises a main track along which a plurality of carriers are movable and a conveyor chain track along which a chain is movable, the conveyor track and the chain track in the zone in question being uniformly spaced relative to one another. Each carrier is provided with a movable pusher dog that is engaged by pusher lugs on the conveyor chain to move the carrier along the track. In order to interrupt the movement of the carrier to perform an operation on the work supported by the carrier or to accommodate timing of the operations in the conveyor system, a stop member is movable into the path of the pusher dogs to move the pusher dogs out of the path of the pusher lugs of the conveyor chain. The pusher dog is interconnected with an accumulating lever that is movable when the pusher dog is depressed to a position where it engages the fixed stop on the conveyor track to prevent inadvertent forward movement of the carrier along the track.

DESCRIPTION OF THE DRAWINGS

FIG. 1 is a partly diagrammatic side elevational view of a conveyor system embodying the invention.

FIG. 2 is a fragmentary sectional view on an enlarged scale taken along the line 2—2 in FIG. 1, showing the parts in a different operative position.

FIG. 5 is a fragmentary partly diagrammatic view similar to FIG. 4 showing the parts in a different operative position.

DESCRIPTION

Figure 3:
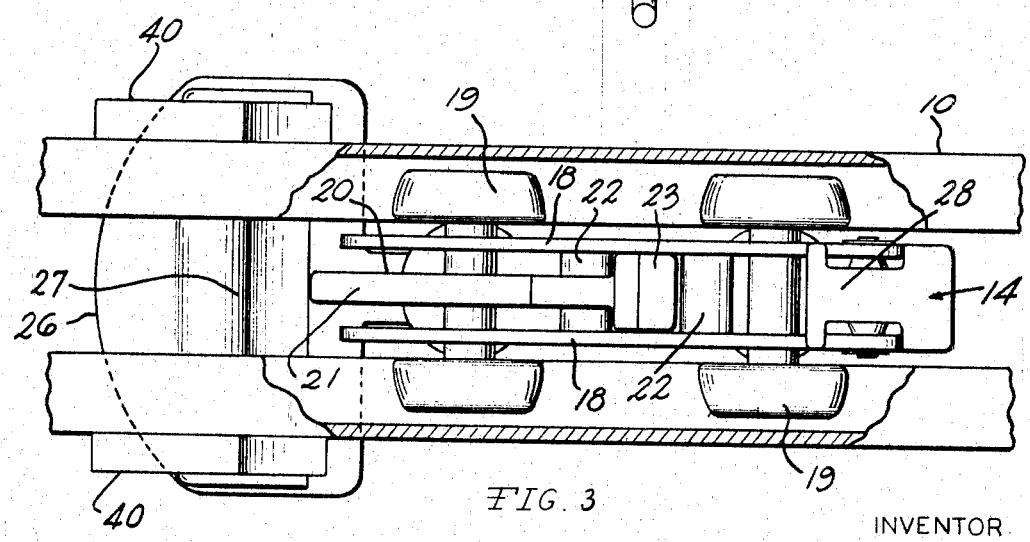
FIG. 3 is a fragmentary part sectional plan view of a portion of the system.

Referring to FIG. 1, the power and free conveyor system shown therein comprises a main track 10 which is defined by inwardly facing channel sections 11 and a conveyor chain track 12 defined by an I-beam. A plurality of carriers 13 are supported on the track 10 and comprise trolleys 14, 15 pivotally interconnected by a tie bar 16. The load is supported from the trolleys 14, 15 by hangers 17. Each trolley 14, 15 is provided with wheels that engage the track 10. As further shown in FIG. 3, the forward trolley 14 comprises spaced plates 18 that support wheels 19 engaging the channels 11 and guide rollers 20 extending between the flanges of the channels to provide lateral stability for the trolleys. The rear trolleys 15 are similarly provided with wheels and rollers.

A movable pusher dog 20 having an upwardly and rearwardly inclined forward surface 21 is mounted for vertical movement within the body of the trolley 14 and guided therein by rollers 22. The lower end of the pusher dog is pivoted by a pin 24 to the rear end of an accumulating lever 25 pivoted between the plates 18. Lever 25 has its forward end inclined as at 26 and provided on its upper surface with a raised projection 27.

Figure 4:
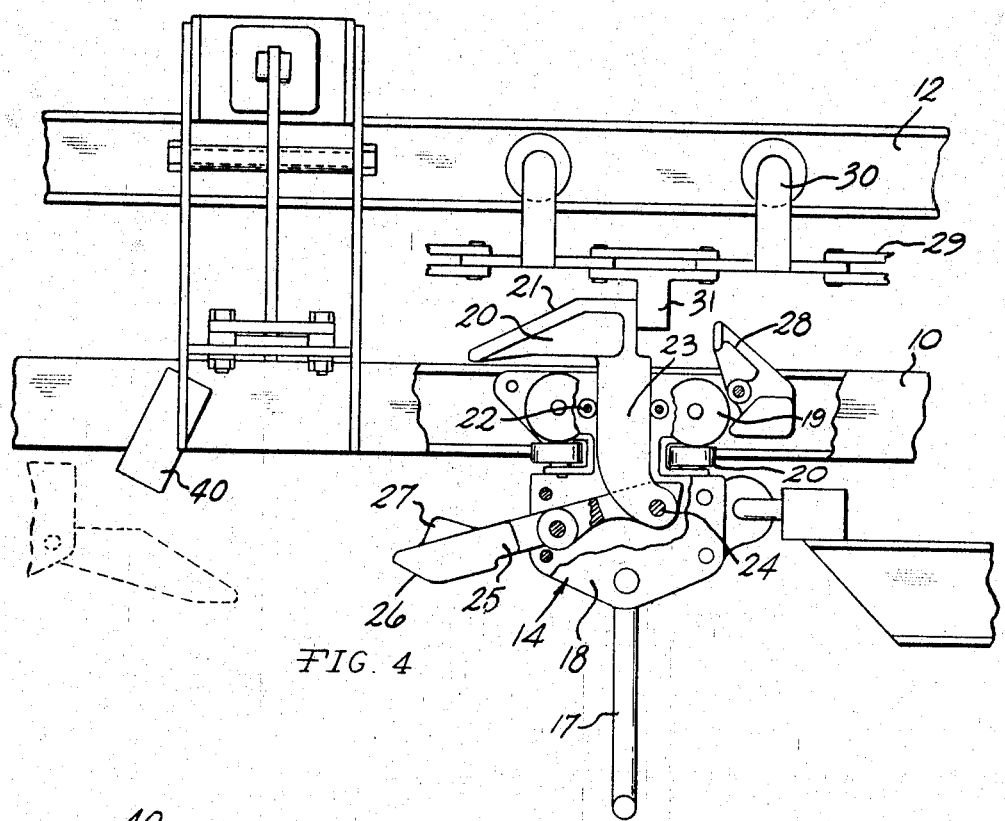
FIG. 4 is a fragmentary side elevational view of a portion of the system shown in FIG. 1.

Each front trolley 14 is also provided with a pivoted hold back dog 28 that is counterweighted so that it is normally in the up position as shown in FIG. 4.

A chain 29 is supported by trolleys 30 on the conveyor chain track 12 and includes downwardly extending pusher lugs 31 that engage the pusher dogs 20 to move the carriers along the track.

When it is desired to stop the carriers along the track, a stop plate 32 supported by a guide member 33 is moved into the path of the pusher dog 20 to depress the pusher dogs out of the path of the pusher lugs 31. Specifically, as shown in FIG. 2, a fluid motor 34 has its shaft 35 pivoted to the upper end of a lever 36 that has its lower end extending into an opening 38 in the plate 32 so that when the motor is operated, the stop plate 32 is moved into and out of the path of the carriers. Such an arrangement is more specifically disclosed in the patent application of Bishop Ser. No. 588,175.

In accordance with the invention, when the plate 32 is moved into the path and depresses the pusher dog 20, the accumulating lever 25 will swing upwardly in a clockwise direction as shown in FIG. 5 bringing the projection 27 into engagement with fixed stops 40 on the track 10 which will positively prevent further movement of the carrier along the track.

When the stop blade 32 is retracted, the pusher dog 20 will be permitted to move upwardly and, in turn, permit the forward end of the accumulating lever 25 to move downwardly out of engagement with the fixed stops 40 so that a succeeding pusher lug 31 of the conveyor chain will engage the pusher dog and move the carrier along the track.

As shown in FIG. 5, the relative positions of the fixed stop 40 and the hold back dog 28 are such that the fixed stop 40 is engaged by the accumulating lever 25 before the hold back dog 28 can move and engage the stop blade 32.

I claim:

1. In a conveyor system, the combination comprising:
   a main track,
   a plurality of carriers movable along the main track,
   a conveyor chain track,
   a conveyor chain movable along said main track,
   each said carrier having a movable pusher dog,
   said conveyor chain having a plurality of pusher lugs adapted to engage said pusher dogs,
   means along said track adapted to engage said pusher dog and move it out of the path of said pusher lug,
   an accumulating lever movably mounted on said carrier and interconnected with said pusher dog whereby when said pusher dog is moved out of the path of said pusher lug by said last mentioned means, said accumulating lever is moved to a second position,
   and stop means along said main track adapted to be engaged by said accumulating lever when it is in its second position for positively interrupting the movement of said carrier along said track when said stop member engages said pusher dog to move it out of the path of said pusher lugs.

2. The combination set forth in claim 1 wherein said stop member comprises a plate movable transversely across the path of said carrier.

3. The combination set forth in claim 1 wherein said track and said conveyor chain are uniformly spaced in the area of said stop member.

4. The combination set forth in claim 1 including a hold back dog on said carrier,
   said hold back dog being positioned such that said fixed stop is engaged by said accumulating lever before said hold back dog is engaged by said stop member.

5. In a conveyor system, the combination comprising:
   a main track,
   a plurality of carriers movable along the main track,
   a conveyor chain track,
   a conveyor chain movable along said main track,
   each said carrier having an upwardly extending movable pusher dog,
   said conveyor chain having a plurality of downwardly extending pusher lugs adapted to engage said pusher dogs,
   means along said track adapted to engage said pusher dog and move it out of the path of said pusher lug,
   an accumulating lever movably mounted on said carrier and interconnected with said pusher dog whereby when said pusher dog is moved downwardly out of the path of said pusher lug by said last mentioned means, said accumulating lever is moved to a second position,
   said accumulating lever having an upwardly extending enlargement adjacent the forward end thereof,
   and downwardly extending stop means along said main track adapted to be engaged by said enlargement on said accumulating lever when it is in said second position for postively interrupting the movement of said carrier along said track when said stop member engages said pusher dog to move it out of the path of said pusher lugs.

6. The combination set forth in claim 5 wherein said stop member comprises a plate movable transversely across the path of said carrier.

7. The combination set forth in claim 5 wherein said track and said conveyor chain are uniformly spaced in the area of said stop member.

8. The combination set forth in claim 5 including a hold back dog on said carrier,
   said hold back dog being positioned such that said fixed stop is engaged by said accumulating lever before said hold back dog is engaged by said stop member.

References Cited

UNITED STATES PATENTS

| 3,229,645 | 1/1966 | Dehne | 104—172 |
| 3,347,171 | 10/1967 | Torrance | 104—172 |

ARTHUR L. LAPOINT, Primary Examiner

DANIEL F. WORTH III, Assistant Examiner

U.S. Cl. X.R.

104—251